United States Patent [19]

Malhi

[11] Patent Number: 5,695,885
[45] Date of Patent: Dec. 9, 1997

[54] EXTERNAL BATTERY AND PHOTOVOLTAIC BATTERY CHARGER

[75] Inventor: Satwinder Malhi, Garland, Tex.

[73] Assignee: Texas Instruments Incorporated, Dallas, Tex.

[21] Appl. No.: 567,870

[22] Filed: Dec. 6, 1995

Related U.S. Application Data

[63] Continuation of Ser. No. 323,315, Oct. 14, 1994, abandoned.
[51] Int. Cl.$^6$ ................................................ H01M 16/00
[52] U.S. Cl. ........................... 429/7; 429/9; 429/123; 429/127
[58] Field of Search ................... 429/7, 9, 123, 429/127, 156, 157

[56] References Cited

U.S. PATENT DOCUMENTS

| | | | |
|---|---|---|---|
| 395,028 | 12/1888 | Bailey et al. | 429/127 |
| 1,935,790 | 11/1933 | Dame | 429/156 |
| 2,798,896 | 7/1957 | Bly | 429/127 |
| 3,023,259 | 2/1962 | Coler et al. | 429/127 |
| 3,353,999 | 11/1967 | Osborn | 429/156 |
| 4,481,265 | 11/1984 | Ezawa et al. | 429/9 |
| 4,522,897 | 6/1985 | Walsh | 429/127 |
| 4,537,838 | 8/1985 | Jetter et al. | 429/9 |
| 4,648,013 | 3/1987 | Curiel | 429/9 |
| 4,703,754 | 11/1987 | Ibbott | 429/127 |
| 4,740,431 | 4/1988 | Little | 429/9 |
| 4,882,239 | 11/1989 | Grimmer et al. | 429/7 |
| 5,378,552 | 1/1995 | Dixon, Jr. | 429/91 |
| 5,496,657 | 3/1996 | Dixon, Jr. | 429/123 X |

*Primary Examiner*—Prince Willis, Jr.
*Assistant Examiner*—Carol Chaney
*Attorney, Agent, or Firm*—Mark A. Valetti; Wade James Brady; Richard L. Donaldson

[57] ABSTRACT

One embodiment of the present invention is a battery (17) (preferably configured in the form of a wrist band, headband, necklace, arm band or a waist band) for a personal electronic device (preferably a watch, a personal communications device, a personal television, or a personal radio), the battery located external to the personal electronic device and comprising: an outer surface (12); an anode (28); a cathode (30); and a connector (10) to electrically connect the battery to the personal electronic device. The battery of the present invention can be flexible. In addition the battery may further include a plurality of photovoltaic cells (22) disposed on the outer surface of the battery, whereby the battery and the photovoltaic cells are operable to supply power to the personal electronic device. Additionally, the plurality of photovoltaic cells would be operable to charge the battery during periods other than when the battery is supplying power to the personal electronic device.

8 Claims, 2 Drawing Sheets

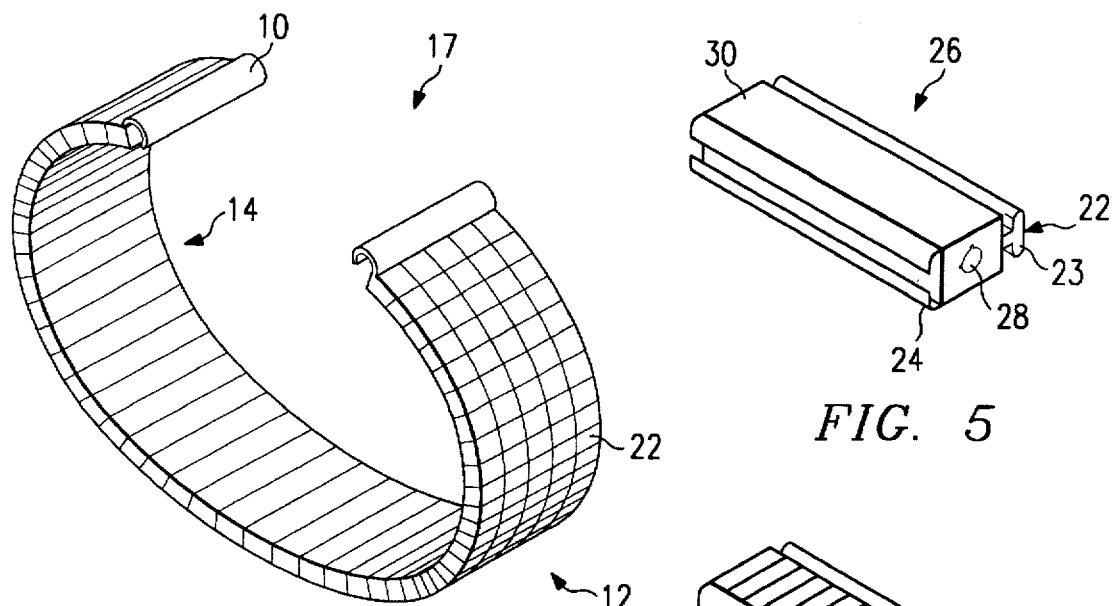
FIG. 4
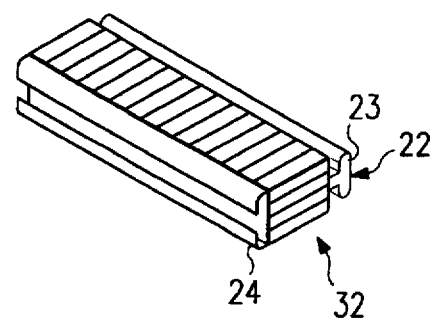
FIG. 5
FIG. 6
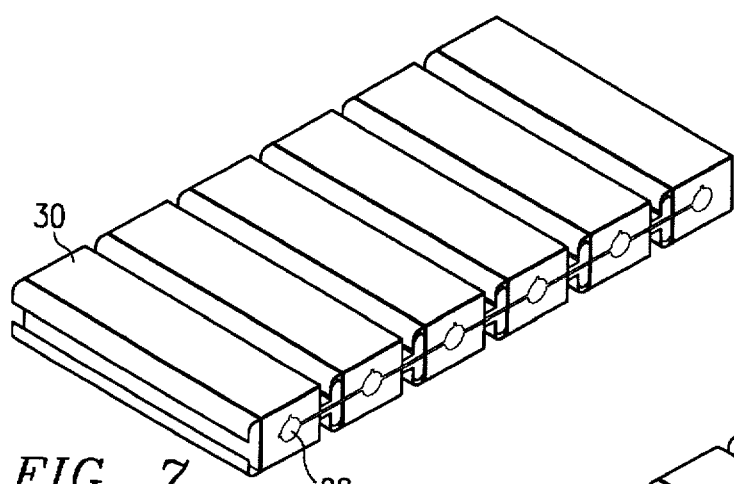
FIG. 7
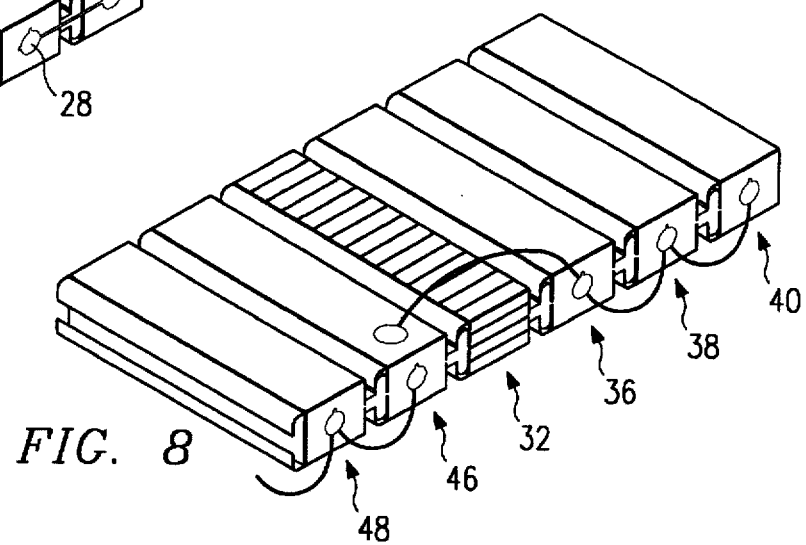
FIG. 8

EXTERNAL BATTERY AND PHOTOVOLTAIC BATTERY CHARGER

This application is a continuation of application Ser. No. 08/323,315, filed Oct. 14, 1994, and now abandoned.

1. Field of the Invention

This invention relates to a battery for a personal electronic device, and, more specifically, to a battery configured in the shape of a wristband, waistband, or necklace.

2. Background of the Invention

Due to the advances in electrical components, several electrical devices have been integrated into smaller and smaller packages. However, one limiting factor to these size reductions is the physical size of the battery that is used to power these devices. Even though the actual electrical circuitry has become very small, the physical dimensions of the casing which holds the electrical device has to remain large enough to encompass the battery in addition to housing the electrical circuitry. This is especially problematic when the electrical circuitry requires relatively large amount of power, and, therefore, a larger battery.

One advantage of the present invention is that it provides a battery of equal or greater capacity than traditional batteries, but it does not require any volume within the casing which holds the electrical circuitry. Another advantage of the present invention, is that the battery can be incorporated into a wristband, waistband, headband, necklace or other similar type structure. Another advantage of the present invention is that the battery will last longer than traditional batteries due to the periodic recharging of the battery by the photovoltaic cells. Another advantage of an embodiment of the present invention is that both the battery and the photovoltaic cell(s) are flexible and can, therefore, be incorporated into many different type structures.

SUMMARY OF THE INVENTION

One aspect of the present invention is a battery which is flexible. Another aspect of the present invention is a series of smaller batteries that are connected so that they provide the equivalent amount of power as a larger battery, but remains flexible at each of the connection points. Another aspect of the present invention is a flexible photovoltaic cell, or series of cells, that is attached to the battery, or series of batteries, for charging the battery. Another aspect of the present invention is a flexible photovoltaic cell, or series of cells, that is conformable to the battery. Another aspect of the invention is a rigid or flexible battery shaped into a wrist band. Another aspect of the present invention is to provide a configuration convenient for carrying spare batteries.

One embodiment of the present invention is a battery (preferably configured in the form of a wrist band, headband, necklace, arm band or a waist band) for a personal electronic device (preferably a watch, a personal communications device, a personal television, or a personal radio), the battery located external to the personal electronic device and comprising: an outer surface; an anode; a cathode; and a connector to electrically connect the battery to the personal electronic device. The battery of the present invention can be flexible. In addition the battery may further include a plurality of photovoltaic cells disposed on the outer surface of the battery, whereby the battery and the photovoltaic cells are operable to supply power to the personal electronic device. Additionally, the plurality of photovoltaic cells would be operable to charge the battery during periods other than when the battery is supplying power to the personal electronic device.

Another embodiment of the present invention is a battery for a personal electronic device, the battery located external to the personal electronic device and comprised of a plurality of link cells, the link cells comprising: an anode; a cathode; a first link mechanism electrically connected to the cathode; a second link mechanism to connect one of the link cells to another link cell, the second link mechanism is electrically connected to the cathode; and wherein the link cells can be connected in parallel or series in order to form the battery.

Another embodiment of the present invention is a battery for a personal electronic device, the battery is formed of a plurality of smaller batteries connected in series or parallel and the battery forms a flexible wristband for the personal electronic device, the smaller batteries comprising: an outer surface; an anode; a cathode; a plurality of photovoltaic cells disposed on the outer surface and operable to supply power to the personal electronic device or charge the smaller batteries; a first link mechanism electrically connected to the cathode; a second link mechanism electrically connected to the cathode; and wherein a first smaller battery can be physically and electrically connected to another of the smaller batteries by inserting the first link mechanism into the second link mechanism. The batteries can be configured in parallel, in series, or where a plurality of smaller parallel-connected batteries are connected in series with another plurality of parallel-connected batteries.

BRIEF DESCRIPTION OF THE DRAWINGS

FIG. 1 illustrates a battery configured into the shape of a wristband.

FIG. 2 illustrates a series of smaller batteries configured into the shape of a wristband.

FIG. 4 depicts another embodiment of the present invention. FIG. 2 illustrates a series of smaller batteries configured into the shape of a flexible wristband, The outer surface of the wristband is covered with photovoltaic cells.

FIG. 5 depicts another embodiment of the present invention. FIG. 5 illustrates a single "Link Cell".

FIG. 6 illustrates a "Dummy Insulator Link Cell" which is used in an embodiment of the present invention.

FIG. 7 illustrates a plurality of parallel-connected Link Cells.

FIG. 8 illustrates a plurality of parallel-connected Link Cells and a Dummy Insulator Link Cell. The configuration of FIG. 8 forms a series of parallel-connected Link Cells.

DETAILED DESCRIPTION OF PREFERRED EMBODIMENTS

Figure 1:
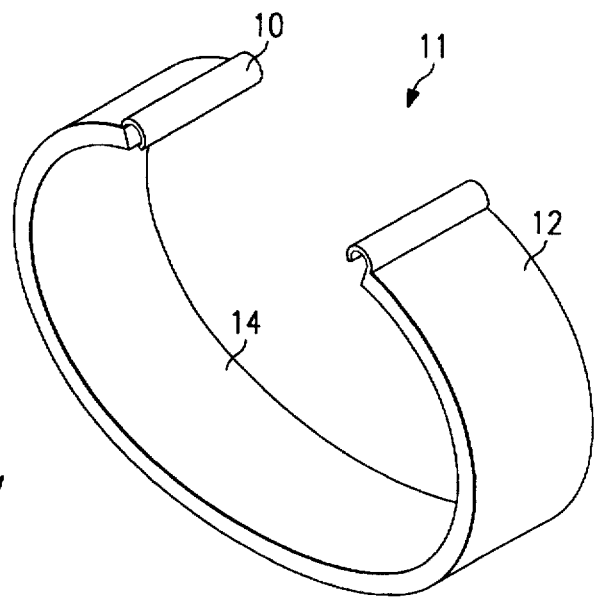
FIG. 1 depicts one embodiment of the present invention.

FIG. 1 depicts a battery for a watch, personal communications device, or other electrical device which is worn on a persons wrist. Battery 11 is shaped in the form of a wrist band. Battery 11 is comprised of an outer surface 12, and inner surface 14, and clasps 10. Clasps 10 are utilized to physically connect the Battery to the watch, personal communications device, or other devices worn on a persons wrist (herein after the watch, personal communications device and other device worn on a persons wrist will be referred to as "wrist devices"). In addition, clasps 10 can also be utilized to make an electrical connection between battery 11 and the wrist device (not shown). Otherwise, the electrical connection between battery 11 and the wrist device can be made by wires or other means of making an electrical connection.

Battery 11 is further comprised of an anode (not shown) and a cathode (not shown). The anode and the cathode can be formed by methods presently known by one skilled in the art or any other future battery fabrication technology which would make it possible for the anode and the cathode to be flexible. In addition, battery 11 may be rechargeable or disposable. Battery 11 can be an alkaline type battery, a nickel cadmium type battery, or any other type of rechargeable battery. However, battery 11 must be fabricated so that the contents of battery 14 does not leak. In addition, battery 11 must be fabricated so that inner surface 14 and outer surface 12 do not corrode.

Figure 2:
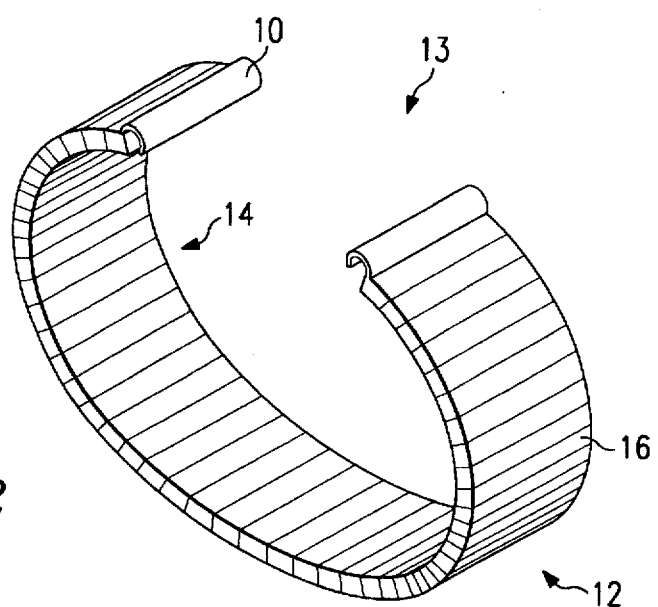
FIG. 2 depicts another embodiment of the present invention.

FIG. 2 depicts another embodiment of the present invention. Instead of creating a single large battery (see FIG. 1), the embodiment of FIG. 2 utilizes several smaller batteries 16 which are interconnected. One advantage of this configuration, is that battery 13 can be fabricated to be flexible even though each smaller battery 16 is rigid. This flexibility can be achieved by flexible interconnections (not shown) between each smaller battery 16. In addition, smaller batteries 16 can be replaced if they become defective.

Figure 3:
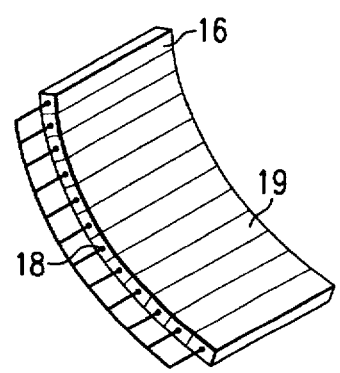
FIG. 3 illustrates a plurality of the smaller batteries of FIG. 2 and the interconnections between the batteries.

FIG. 3 depicts several smaller batteries 16 and a possible interconnection between these batteries. Each battery 16 is comprised of a terminal for the anode 18 and a terminal for the cathode 19. One aspect of the embodiment of FIG. 2 is that each smaller battery 16 can be connected in series or in parallel. These connections can either be made through the interconnections between the batteries or by separate wires incorporated into the batteries. FIG. 3 depicts anode and cathode terminals and a parallel connection between the smaller cells 16 for illustrative purposes. This figure is not intended to imply that this is the only possible configuration of the batteries nor the exact means of interconnecting the batteries. Deviations of these connections and terminal configurations will become obvious to one of ordinary skill in the art in view of this specification.

FIG. 4 depicts a rechargeable battery 17 which consists of a battery, similar to battery 13 of FIG. 2, and a plurality of photovoltaic cells 22 on the outer surface 12 of battery 17. The battery can be recharged by the photovoltaic cells 22 during periods when the wrist device is not being used. In addition, photovoltaic cells 22 can be utilized to provide a portion of the power required by the wrist device when it is powered. Photovoltaic cells 22 can either be rigid or flexible. If the cells are rigid then they would have to be affixed to a rigid portion of the battery (such as smaller battery 16 of FIG. 2). However, if the photovoltaic cells 22 are flexible then they could be affixed to smaller batteries 16 (FIG. 2) or battery 11 (FIG. 1) which is either curved or flexible.

FIG. 5 illustrates one possible embodiment of a smaller battery and link mechanism (the battery/link mechanism is also referred to as a "Link Cell") that can be used to make a wristband. Battery 26 is comprised of a male link mechanism 22, a female link mechanism 24, anode 28 and a cathode. Since the cathode of battery 26 can be directly connected to the external casing 30 and/or the male and female link mechanisms of battery 26, the cathode of each battery 26 is essentially connected in parallel when the female link mechanism 24 of one battery 26 is connected to the male link mechanism 22 of another battery 26. Therefore, as is shown in FIG. 7, in order to create a wrist band out of a plurality of batteries 26, connected in parallel, some form of electrical connection must be made between anode 28 of each battery 26 of the wristband. This electrical connection would preferably be made by some form of wire or conductive strip.

The head 23 of male link mechanism 22 can have different cross-sectional shapes. The preferable cross-sectional shape would be circular because it would allow the male link mechanism 22 to freely rotate within female link mechanism 24. In addition, it is desirable that male link mechanism 22 remains in direct contact with female link mechanism 24 in which male link mechanism is linked to. This is especially important in a configuration in which the cathode of one battery is connected to the cathode of another battery via the link mechanisms.

FIG. 6 is an illustration of a dummy insulator link cell. Dummy insulator link cell 32 is made of an insulating material and is comprised of male link mechanism 22 and female link mechanism 24. These link mechanisms are identical in shape to the link mechanisms used on the Link Cell of FIG. 5. Dummy insulator link cell 32 can be used in a wristband configuration in which the individual batteries are to be connected in series (or a group of parallel connected batteries are to be connected in series, see FIG. 8), but the cathode of the individual Link Cell 22 are electrically connected to the link mechanisms.

FIG. 8 illustrates a wristband in which a plurality of parallel-connected Link Cells are connected in series with another plurality of parallel-connected Link Cells. As is shown in FIG. 8, dummy insulator link cell 32 is disposed between parallel-connected Link Cells 36, 38, and 40, and parallel-connected Link Cells 46 and 48. As was discussed above, the placement of dummy insulator link cell is important because it allows the cathode of Link Cell 46 to be connected to the anode of Link Cell 36. Mother means of accomplishing this is to make the cathode of a Link Cell electrically isolated from the link mechanisms. However, in order to connect the Link Cells in parallel, some means other than the electrically isolated link mechanisms must be used for electrically connecting all of the cathodes together.

Although specific embodiments of the present invention are herein described, they are not to be construed as limiting the scope of the invention. Many embodiments of the present invention will become apparent to those skilled in the art in light of methodology of the specification. The scope of the invention is limited only by the claims appended.

What is claimed is:

1. A battery for a personal electronic device, said battery is formed of a plurality of smaller batteries connected in series or parallel and said battery forms a flexible wristband for powering said personal electronic device, each of said smaller batteries comprising:

an outer surface;

an anode;

a cathode;

a plurality of photovoltaic cells disposed on said outer surface and operable to supply power to said personal electronic device or charge said smaller batteries;

a first link mechanism electrically connected to said cathode;

a second link mechanism electrically connected to said cathode; and wherein a first smaller battery can be physically and electrically connected to a second smaller battery by inserting the first link mechanism into the second link mechanism thereby movably connecting said first smaller battery to said second smaller battery.

2. The battery of claim 1 wherein said plurality of photovoltaic cells are operable to charge said battery during periods other than when the battery is supplying power to said personal electronic device.

3. The battery of claim 1 wherein said battery is formed configured as a: wrist band, headband, necklace, arm band or a waist band.

4. The battery of claim 1 wherein said smaller batteries are connected in parallel.

5. The battery of claim 1 wherein said smaller batteries are connected in series.

6. The battery of claim 1 where a plurality of smaller parallel-connected batteries are connected in series with another plurality of parallel-connected batteries.

7. The personal electronic system of claim 1 wherein said personal electronic device is selected from the group consisting of: a watch, a personal communications device, a personal television, and a personal radio.

8. A personal electronic system including a personal electronic device and a battery, said battery is formed of a plurality of smaller batteries connected in series or parallel and said battery forms a flexible band for powering said personal electronic device, each of said smaller batteries comprising:

an outer surface;

an anode;

a cathode;

a plurality of photovoltaic cells disposed on said outer surface and operable to supply power to said personal electronic device or charge said smaller batteries;

a first link mechanism electrically connected to said cathode;

a second link mechanism electrically connected to said cathode; and wherein a first smaller battery can be physically and electrically connected to a second smaller battery by inserting the first link mechanism into the second link mechanism thereby movably connecting said first smaller battery to said second smaller battery.

* * * * *